US012678762B2

(12) United States Patent
Ye et al.

(10) Patent No.: US 12,678,762 B2
(45) Date of Patent: Jul. 14, 2026

(54) ASSISTANT SYSTEM FOR SOLUTION-PHASE SYNTHESIS

(71) Applicant: GlycodePharma Co., Ltd., Beijing (CN)

(72) Inventors: Xinshan Ye, Beijing (CN); Wenlong Yao, Beijing (CN); Decai Xiong, Beijing (CN)

(73) Assignee: GlycodePharma Co., Ltd., Beijing (CN)

( * ) Notice: Subject to any disclaimer, the term of this patent is extended or adjusted under 35 U.S.C. 154(b) by 638 days.

(21) Appl. No.: 18/268,163

(22) PCT Filed: Dec. 18, 2021

(86) PCT No.: PCT/CN2021/139398
§ 371 (c)(1),
(2) Date: Jun. 16, 2023

(87) PCT Pub. No.: WO2022/127926
PCT Pub. Date: Jun. 23, 2022

(65) Prior Publication Data
US 2024/0050921 A1    Feb. 15, 2024

(30) Foreign Application Priority Data
Dec. 19, 2020    (CN) .......................... 202011509006.3

(51) Int. Cl.
*B01J 19/18* (2006.01)
*B01J 19/00* (2006.01)
*B01J 19/12* (2006.01)

(52) U.S. Cl.
CPC ........... *B01J 19/18* (2013.01); *B01J 19/0066* (2013.01); *B01J 19/123* (2013.01); *B01J 2219/00153* (2013.01); *B01J 2219/00689* (2013.01)

(58) Field of Classification Search
CPC  B01J 19/18; B01J 19/123; B01J 2219/00153; B01J 2219/00689
See application file for complete search history.

(56) References Cited

U.S. PATENT DOCUMENTS

| 5,547,590 A | 8/1996 | Szabo |
| 5,779,912 A * | 7/1998 | Gonzalez-Martin ..... B01J 8/009 |
| | | 210/748.14 |

(Continued)

FOREIGN PATENT DOCUMENTS

| CN | 101234325 A | 8/2008 |
| CN | 105833815 A | 8/2016 |

(Continued)

OTHER PUBLICATIONS

First Office Action received for Chinese Patent Application Serial No. 202011509006.3 dated Aug. 17, 2021, 17 pages.

(Continued)

*Primary Examiner* — Randy Boyer
(74) *Attorney, Agent, or Firm* — IPro, PLLC; Na Xu

(57) ABSTRACT

An assistant system for solution-phase synthesis is disclosed. The assistant system for solution-phase synthesis includes: a reactor (1), a mixing device (2), a temperature control device (3) and a host computer (4). The reactor (1) is arranged on the mixing device (2), the mixing device (2) and the temperature control device (3) are both electrically connected to the host computer (4), so as to implement programmed temperature control over the entire assistant system for solution-phase synthesis. A bottle body (15) of the reactor (1) is arranged to include a reaction inner container (151), a temperature circulating layer (152) and a vacuum layer (153) from inside to outside in sequence.

9 Claims, 2 Drawing Sheets

(56)                  References Cited

U.S. PATENT DOCUMENTS

| | | | | |
|---|---|---|---|---|
| 6,132,686 | A * | 10/2000 | Gallup | B01F 35/2136 |
| | | | | 422/534 |
| 2009/0152744 | A1 * | 6/2009 | Mou | C12M 27/20 |
| | | | | 261/119.1 |
| 2021/0032136 | A1 * | 2/2021 | Cates | C02F 1/32 |
| 2021/0339220 | A1 * | 11/2021 | Khatiwada | B01J 19/122 |
| 2022/0131214 | A1 * | 4/2022 | Wankewycz | H01M 8/04888 |

FOREIGN PATENT DOCUMENTS

| | | |
|---|---|---|
| CN | 207085871 U | 3/2018 |
| CN | 112705151 A | 4/2021 |
| GB | 1 404 163 A | 8/1975 |
| WO | 2010/028164 A1 | 3/2010 |

OTHER PUBLICATIONS

Second Office Action received for Chinese Patent Application Serial No. 202011509006.3 dated Oct. 27, 2021, 18 pages.

* cited by examiner

ASSISTANT SYSTEM FOR SOLUTION-PHASE SYNTHESIS

CROSS REFERENCE TO RELATED APPLICATION

This application is a national stage application of International Patent Application No. PCT/CN2021/139398, filed on Dec. 18, 2021, which claims priority of the Chinese Patent Application No. 202011509006.3, filed with the China National Intellectual Property Administration (CNIPA) on Dec. 19, 2020, and entitled "ASSISTANT SYSTEM FOR SOLUTION-PHASE SYNTHESIS", both of which are incorporated by references in their entities as part of the present application.

TECHNICAL FIELD

The present disclosure relates to the technical field of experimental apparatuses, and in particular to an assistant system for solution-phase synthesis.

BACKGROUND

Mixing operation and temperature control are critical to results of existing solution-phase synthesis experiments. It's common practice to employ a water bath or oil bath for controlling a temperature of general solution-phase experiments. Without programmed temperature control, the water bath or oil bath still needs manual control and speed adjustment, which is time-consuming for operators. With automatic programmed temperature control and speed control, both hands will be liberated perfectly and accordingly, the efficiency will be increased. Particularly, in the case of a light illumination reaction, a solution reaction generally takes place in a two-necked quartz reactor, while the experiment is carried out by way of side illumination in a low temperature bath at −80° C. During side illumination, a long-arc mercury lamp and a cold trap made of quartz generally serve as a light source device. Such a light source device requires the quartz cold trap to be equipped with a low-temperature circulation device to keep a circulation temperature (−20° C. because the mercury lamp cannot be switched on at a lower temperature) higher than the temperature of the low-temperature bath (−80° C.). As a consequence, accurate control over the temperature of the low-temperature bath is far from easy, and the low-temperature circulation device needs to be additionally arranged and switched on in time before the mercury lamp is switched on. If the mercury lamp is switched on while the low-temperature circulation device of the cold trap is switched off, a considerable risk of fire will be caused by long-time illumination from the mercury lamp switched on.

In order to solve the above problems, when the long-arc mercury lamp and the cold trap made of quartz are configured for illumination, the cold trap is placed horizontally to allow ultraviolet light to illuminate a reactor from top to bottom, and the reactor is placed in an ethanol/dry ice low-temperature bath Dewar flask. In this way, the temperature can keep stable under control, a model reaction synthesis effect is as good as that in a previous laboratory side-illumination way and even better. However, since the cold trap still needs to be cooled, the low-temperature circulation device of the cold trap needs to be switched on additionally, resulting in inconvenience to instrument assembly, insecurity, ultralow utilization rate of ultraviolet light and requirement for an additional ultraviolet protector.

In view of this, it is an urgent technical problem in the art to provide an assistant system or device for experimental solution-phase synthesis, which features programmed and stable temperature control and easy assembly, and can improve the utilization rate of ultraviolet light during experimental illumination, so as to achieve dual functions of common chemical reactions and photocatalytic reactions.

SUMMARY

In view of this, an objective of the present disclosure is to provide an assistant system for solution-phase synthesis, which features programmed and stable temperature control and easy assembly, and can improve a utilization rate of ultraviolet light during experimental illumination.

To achieve the above objective, the present disclosure provides an assistant system for solution-phase synthesis, including: a novel reactor, a mixing device, a temperature control device and a host computer; where the novel reactor is arranged on the mixing device, and the mixing device and the temperature control device are both electrically connected to the host computer; and the novel reactor includes a bottle body, and the bottle body includes a reaction inner container, a temperature circulating layer and a vacuum layer from inside to outside in sequence.

In some embodiments, the novel reactor further includes: a bottle mouth, a sample injection port, a gas outlet, a sampling port, a circulating liquid outlet and a circulating liquid inlet, where a given angle is formed between the sample injection port and the bottle body; the gas outlet and the sample injection port are symmetrically arranged with respect to a center line of the bottle mouth; the sampling port is in communication with the reaction inner container; a bottom of the reaction inner container has an arc-shaped structure; and the circulating liquid outlet and the circulating liquid inlet are both in communication with the temperature circulating layer, and the circulating liquid outlet and the circulating liquid inlet are arranged diagonally.

In some embodiments, the temperature control device includes a low-temperature circulator, where a liquid outlet of the low-temperature circulator is connected to the circulating liquid inlet through a pipe; and a liquid inlet of the low-temperature circulator is connected to the circulating liquid outlet through a pipe.

In some embodiments, the assistant system for solution-phase synthesis further includes a light source device, where the light source device includes an ultraviolet light source, and the ultraviolet light source is configured to illuminate the novel reactor.

In some embodiments, the ultraviolet light source is a light source of a mercury lamp of a type of CEL-M series.

In some embodiments, the given angle is 60°.

In some embodiments, a space included angle between a center line of the sampling port and a center line of the gas outlet is 60°.

In some embodiments, an upper cover is arranged on the bottle mouth, and the upper cover is a high light transmittance quartz plate.

In some embodiments, the mixing device includes an automatic stirrer and a thermostat tray, where the automatic stirrer and the thermostat tray are both electrically connected to the host computer; the automatic stirrer is configured for stirring a mixed solution in the novel reactor in accordance with a stirring instruction from the host computer; the novel reactor is arranged on the automatic stirrer; and the thermostat tray is configured for keeping a temperature of the novel reactor constant.

According to particular embodiments provided in the present disclosure, the present disclosure has the following technical effects:

The assistant system for solution-phase synthesis provided in the present disclosure includes: a novel reactor, a mixing device, a temperature control device and a host computer; where the novel reactor is arranged on the mixing device, the mixing device and the temperature control device are both electrically connected to the host computer, such that the entire assistant system for solution-phase synthesis may control a temperature stably and may be easy to assemble. Furthermore, the bottle body of the novel reactor is arranged to include a reaction inner container, a temperature circulating layer and a vacuum layer from inside to outside in sequence, so as to further increase a heat preservation effect and also improve the utilization rate of ultraviolet light during experimental illumination.

BRIEF DESCRIPTION OF THE DRAWINGS

To describe technical solutions in embodiments of the present disclosure or in the prior art more clearly, the accompanying drawings required for the embodiments are briefly described below. Apparently, the accompanying drawings in the following description show merely some embodiments of the present disclosure, and those of ordinary skill in the art can still derive other accompanying drawings from these accompanying drawings without creative efforts.

REFERENCE NUMERALS

1—novel reactor, 11—bottle mouth, 12—sample injection port, 13—gas outlet, 14—sampling port, 15—bottle body, 151—reaction inner container, 152—temperature circulating layer, 153—vacuum layer, 16—circulating liquid inlet, 17—circulating liquid outlet, 18—upper cover, 2—mixing device, 31—ultraviolet light source, 32—low-temperature circulator, 3—temperature control device, 21—automatic stirrer, 22—thermostat tray, and 4—host computer.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

An objective of the present disclosure is to provide an assistant system for solution-phase synthesis, which features stable temperature control and easy assembly, and may also improve a utilization rate of ultraviolet light during experimental illumination.

To make the above objectives, features, and advantages of the present disclosure clearer and more comprehensible, the present disclosure will be further described in detail below in conjunction with the accompanying drawings and the specific implementation modes.

Figure 1:
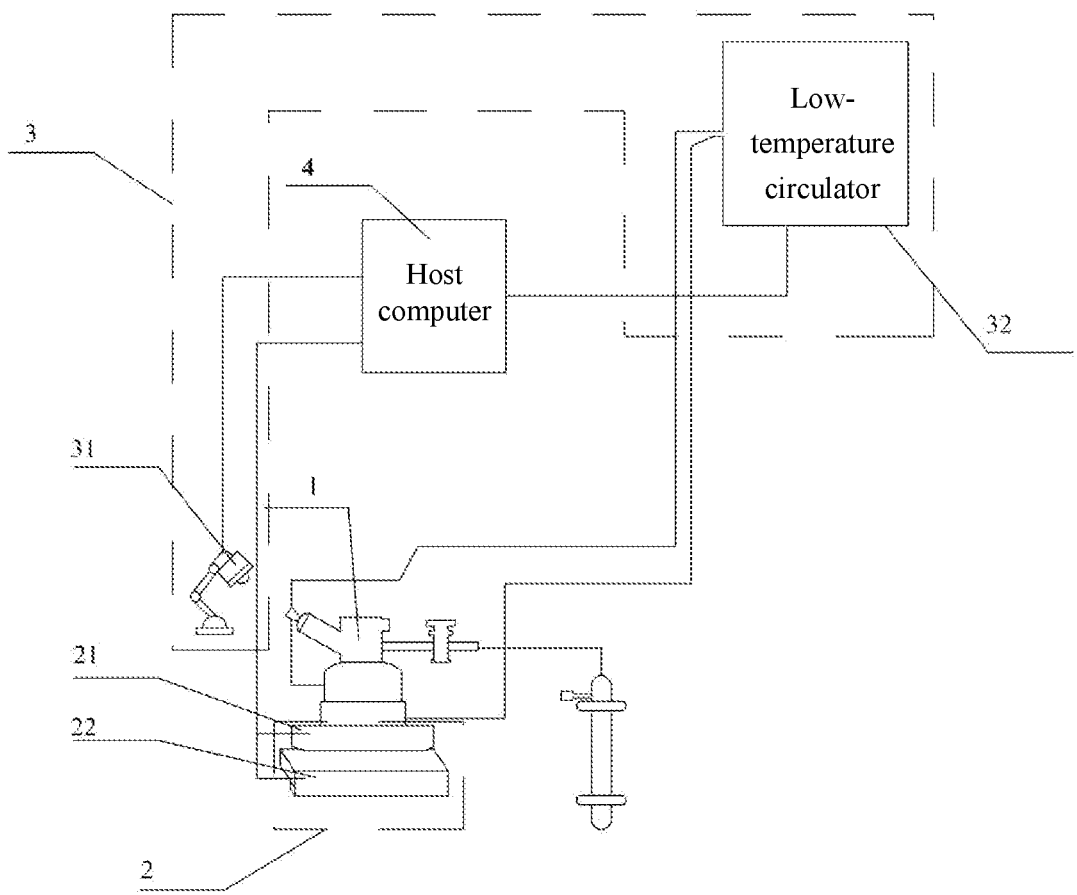
FIG. 1 is a schematic structural diagram of an assistant system for solution-phase synthesis according to the present disclosure.

FIG. 1 is a schematic structural diagram of an assistant system for solution-phase synthesis according to the present disclosure. As shown in FIG. 1, the assistant system for solution-phase synthesis includes: a novel reactor 1, a mixing device 2, a temperature control device 3 and a host computer 4.

A software program is embedded in the host computer 4, and the software program is configured to control a particular work flow of the mixing device 2 and the temperature control device 3.

The novel reactor 1 is arranged on the mixing device 2, and the mixing device 2 and the temperature control device 3 are both electrically connected to the host computer 4.

Figure 3:
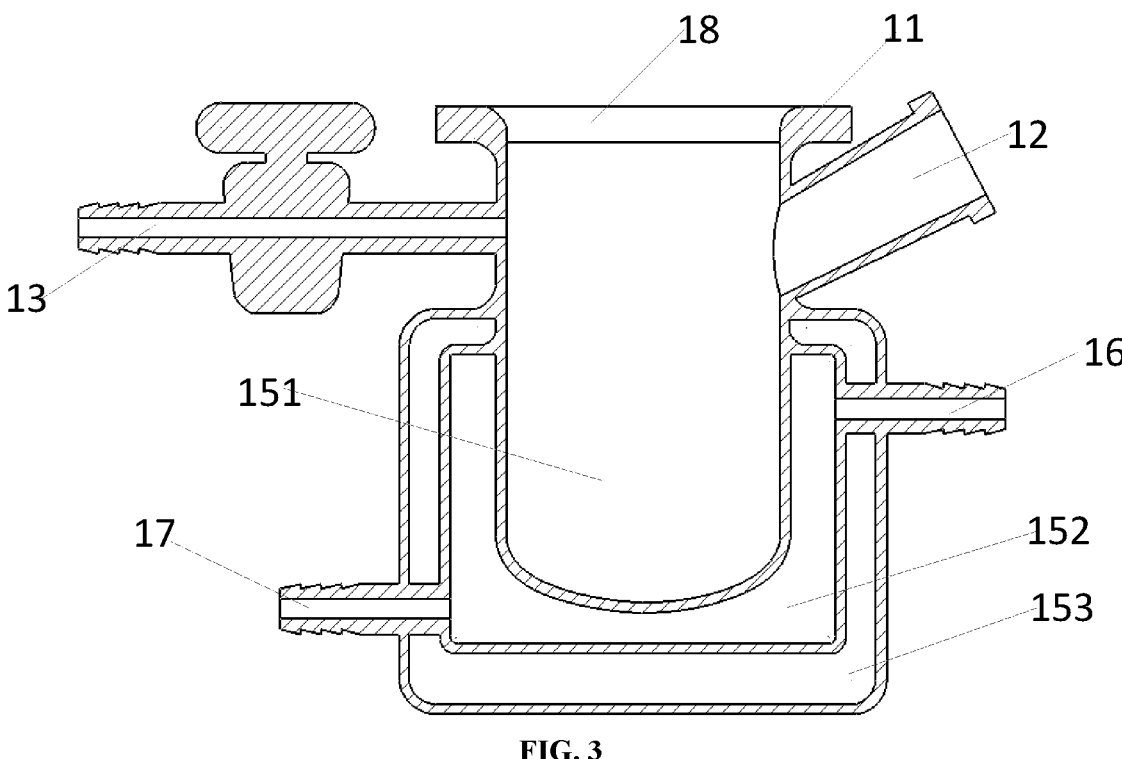
FIG. 3 is a side view of a novel reactor having a U-shaped reaction inner container according to the present disclosure.

As shown in FIG. 3, the novel reactor 1 includes a bottle body 15. The bottle body 15 includes a reaction inner container 151, a temperature circulating layer 152 and a vacuum layer 153 from inside to outside in sequence.

Figure 2:
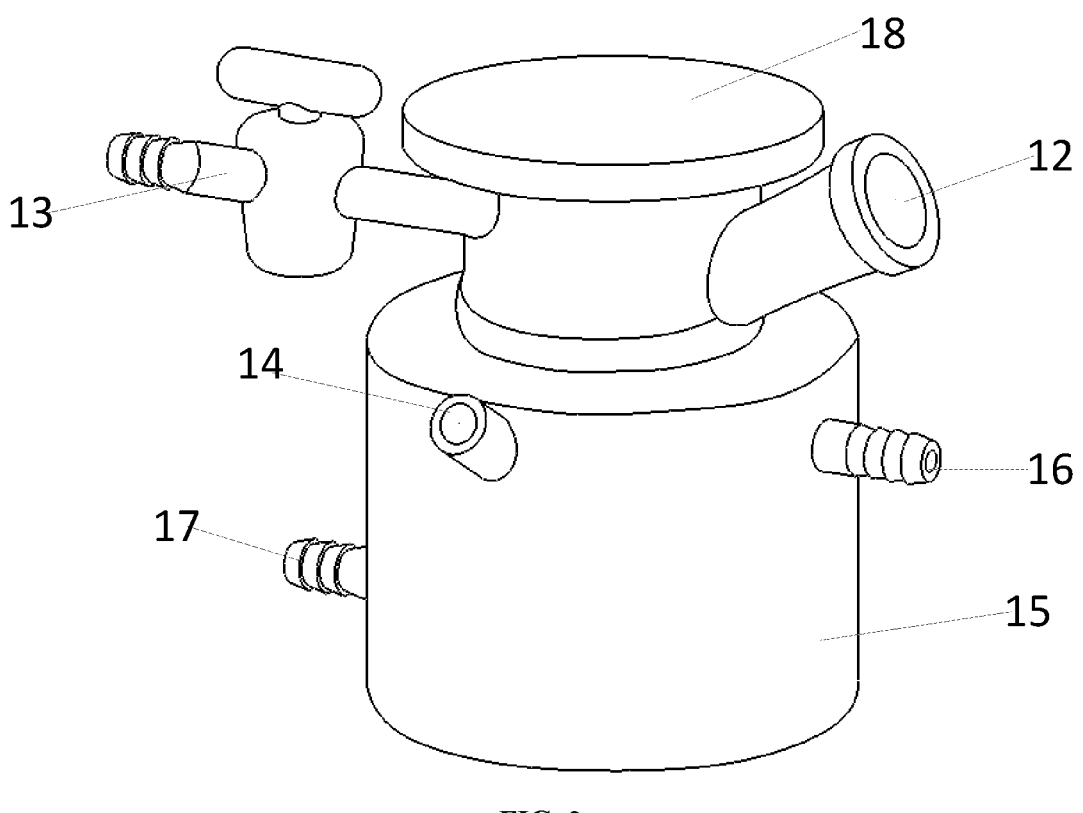
FIG. 2 is a schematic structural diagram of a novel reactor according to the present disclosure.

Preferably, as shown in FIGS. 2 and 3, the novel reactor 1 further includes: a bottle mouth 11, a sample injection port 12, a gas outlet 13, a sampling port 14, a circulating liquid inlet 16 and a circulating liquid outlet 17.

A given angle (preferably 60° in the present disclosure) is formed between the sample injection port 12 and the bottle body 15. The gas outlet 13 and the sample injection port 12 are symmetrically arranged with respect to a center line of the bottle mouth 11. The sampling port 14 is in communication with the reaction inner container 151. A bottom of the reaction inner container 151 has an arc-shaped structure.

In the present disclosure, the arc-shaped structure is preferably a spherical or U-shaped structure. The circulating liquid inlet 16 and the circulating liquid outlet 17 are both in communication with the temperature circulating layer 152, and the circulating liquid inlet 16 and the circulating liquid outlet 17 are arranged diagonally. A space included angle between a center line of the sampling port 14 and a center line of the gas outlet 13 is also preferably 60°.

An upper cover 18 is arranged on the bottle mouth 11 of the novel reactor 1. The upper cover 18 is a high light transmittance quartz plate.

Preferably, as shown in FIG. 1, the temperature control device 3 includes a low-temperature circulator 32.

A liquid outlet of the low-temperature circulator 32 is connected to the circulating liquid inlet 16 through a pipe. A liquid inlet of the low-temperature circulator 32 is connected to the circulating liquid outlet 17 through a pipe.

Preferably, the assistant system for solution-phase synthesis further includes a light source device, where the light source device includes an ultraviolet light source 31, and the ultraviolet light source 31 is configured to illuminate the novel reactor 1.

The ultraviolet light source 31 is configured to illuminate the novel reactor 1. In the present disclosure, the ultraviolet light source 31 is preferably a light source of a mercury lamp of a type of CEL-M series.

Preferably, the mixing device 2 includes an automatic stirrer 21 and a thermostat tray 22.

The automatic stirrer 21 and the thermostat tray 22 are both electrically connected to the host computer 4. The automatic stirrer 21 is configured for stirring a mixed solution in the novel reactor 1 in accordance with a stirring instruction from the host computer 4. The novel reactor 1 is arranged on the automatic stirrer 21. The automatic stirrer 21 is arranged on the thermostat tray 22. The automatic stirrer 21 rotates to drive the novel reactor 1 to rotate, so as to implement a stirring function by means of centrifugal force. The thermostat tray 22 is configured to keep a temperature of the novel reactor 1 constant.

Furthermore, the automatic stirrer 21 in the present disclosure may be a stirring bar arranged above the novel reactor 1, so as to uniformly mix the solution by stirring the mixed solution in the reactor.

The significance of the assistant system for solution-phase synthesis according to the present disclosure will be described below by taking the above overall arrangement idea of the assistant system for solution-phase synthesis as an example. Under the condition that a photocatalytic reaction needs to be carried out, it is the first step to solve the problem of converting a single-necked flask and a two-necked flask used in a common "pre-activation" one-pot in a laboratory into a dedicated reactor which is durable, resistant to low temperature, slow to cool down, easy to operate and satisfies the requirements for injection and sampling, and further satisfies an imported quartz material with a high ultraviolet light throughput rate so as to integrate light-mediated "pre-activation" automatic one-pot synthesis.

Since a common two-necked quartz reactor is used in a laboratory manual light-mediated one-pot synthesis in a side illumination way in a low-temperature bath at −80° C., an imported long-arc mercury lamp and a cold trap (used for radiating heat from the mercury lamp) made of quartz are required, and the quartz cold trap is required to be equipped with a low-temperature circulation device to keep a circulation temperature (−20° C. because the mercury lamp cannot be switched on at a lower temperature) higher than the temperature of the low-temperature bath (−80° C.). As a consequence, accurate control over the temperature of the low-temperature bath is far from easy, and the low-temperature circulation device needs to be additionally arranged and switched on in time before the mercury lamp is switched on. Under the condition that the mercury lamp is switched on while the low-temperature circulation device of the cold trap is switched off, a considerable risk of fire will be caused by long-time illumination from the mercury lamp switched on.

In order to circumvent possible safety risks mentioned above and to control the instability factors, the present disclosure starts by changing an illumination mode of a light source and re-selecting a safer and stable ultraviolet light source. Through repeated discussion and design, an illumination mode of "from top to bottom" is used firstly, and a 25 mL flat-top quartz flask with two ports (sample injection port and sampling port) is designed. There is no problem in light-mediated synthesis of model reaction disaccharides by means of testing.

Considering poor price and moldability of all-quartz material, with reference to a commercial reactor, the 25 mL reactor is transformed into a reactor only having a quartz plate upper cover with high light transmittance. A reactor body is made of glass and is easily sealed by gaskets and flange clamps, but splash is likely to be caused during stirring due to a flat bottom. In order not to be limited to a low-temperature bath for temperature reduction with poor stability of temperature control, with reference to a commercial double-jacketed reactor, a reactor with a double-jacketed quartz upper cover is designed, and is equipped with a gas inlet, an gas outlet, a sample injection port and a sampling port and sealed by a threaded cap and a pierceable gasket. Since one-pot glycosylation requires fresh activated molecular sieves, and a reaction solution is a suspension, the molecular sieves tends to be accumulated at the lower sampling port to cause uneven stirring, such that a double-jacketed reactor is designed. In the double-jacketed reactor, the sample injection port and the gas inlet are combined into one, and the sampling port is innovatively changed into an angle inclined at 60° upwards, so as to avoid overflow of the reaction solution and facilitate sampling. A shape inside a jacket is then changed from a U shape to an eggplant shape for stability of stirring. With the use in the test reaction, it is found that an outer layer of the double-jacketed reactor requires ultra-low temperature circulation (−80° C.), resulting in a large amount of frost condensation, condensed water is generated, and a change of the reaction solution in the reactor cannot be directly observed, such that a layer of vacuum is redesigned to facilitate heat preservation and prevent frost condensation, and then a clever and complex three jacketed reactor is obtained. The three jacketed reactor is the above novel reactor 1 according to the present disclosure. The reactor is provided with a sample injection port, a circulating liquid outlet, a circulating liquid inlet, an imported quartz upper cover, a sampling port, an ultra-low temperature circulating layer and a vacuum layer, so as to satisfy all the requirements for the light-mediated "pre-activation" one-pot synthesis and the common "pre-activation" one-pot synthesis.

Repeated test and repetition of model reaction can achieve an effect of laboratory manual synthesis. Finally, in order to satisfy fusion of automatic sampling and injection, the sampling port sealed by a threaded cap and the pierceable gasket is rotated by 180° to obtain a final 25 mL three-jacketed dual-function reactor with accurate temperature control, and a three-jacketed dual-function reactor scaled up to 100 mL is further designed to satisfy gram-scale automatic synthesis.

As it has already been mentioned above that the ultraviolet light sources of laboratories have safety risks, the choice and design of the light sources are constantly changing with the ingenious design and constant updating of the reactor.

In early verification of the illumination mode of "from top to bottom", the original long-arc mercury lamp and cold trap made of quartz for laboratories are still used. The cold trap is placed horizontally, to allow ultraviolet light to illuminate the two-neck reactor having a quartz plate upper cover from top to bottom, and the reactor is placed in an ethanol/dry ice low-temperature bath Dewar flask. In this way, the temperature can keep stable under control, a model reaction synthesis effect is as good as that in a previous laboratory side-illumination way and even better. However, since the cold trap still needs to be cooled, the low-temperature circulation device of the cold trap needs to be switched on additionally, resulting in inconvenience to instrument assembly, insecurity, ultralow utilization rate of ultraviolet light and requirement for an additional ultraviolet protector.

In view of the shortcomings of previous ultraviolet light sources, a xenon lamp is initially used as a new temperature control device instead of the original long-arc mercury lamp. The temperature control device uses an imported xenon lamp bulb and air cooling, light energy output is concentrated, and ultraviolet power is high, so as to facilitate the use of light in the experiment and accelerate the experimental efficiency. Besides, the modular design of the temperature control device facilitates assembly of other devices, heat dissipation is constant, and light energy output is stable. Moreover, the system is equipped with an intelligent program to implement automatic switching-on and switchingoff, automatic adjustment of luminous power, self-defined switching times and frequency, digital monitoring, and program mode, which is basically consistent with features of automatic instrument assembly.

After repeated attempts of the model reaction and continuous adjustment of reaction conditions, a yield of model reaction disaccharides is basically consistent with that in the laboratory, but the model tetrasaccharides still cannot be obtained in the light-mediated "pre-activation" one-pot synthesis, especially the trisaccharides cannot be synthesized. After observing a state of the reacted reaction solution in the reactor, it is found that an unknown black substance is generated. Considering that the xenon lamp has a continuous output with 200 nm-1200 nm wavelength and the ultraviolet output power is large to destroy glycosylation intermediates or other reasons, this temperature control device can only be discarded.

Based on the above research experience, a mercury lamp of CEL-M series serves as a new light source device. A 350 W/500 W high-voltage short-arc spherical mercury lamp may be mounted in the device. The light source device also uses air-cooled heat dissipation, forms arc discharge under high-frequency and high-voltage excitation, has light concentration efficiency, radiates a strong and stable ultraviolet intense spectrum, and has high energy density and stable output. Most importantly, the lamp is fixed in an internal heat dissipation device, without security risk.

However, the use of mercury lamps is quite different from the use of xenon lamps. An extended time for starting and closing an arc exists, there is no intelligent control program, and an activating switch action is required, which increases difficulty in connecting to automatic program control. Therefore, in the present disclosure, after the mercury lamp of CEL-M series is used, a control program in the host computer is subjected to controllable programmed transformation for a voltage-stabilized power supply, to receive programmed control by the host computer, so as to switch the lamp automatically. Finally, the transformed 500 W mercury lamp is determined to serve as the ultraviolet light source of the assistant system for solution-phase synthesis.

Moreover, the present disclosure also validates the "pre-activation" one-pot synthesis mediated by a 532 nm laser light source in order to increase the utilization rate of the light source and expand possible visible light-mediated one-pot automatic synthesis. Although the model reaction tetrasaccharides can also be obtained by means of "pre-activation" one-pot synthesis, the absorbance of 56% is significantly lower than that of 65% by using the mercury lamp of CEL-M series, and "delayed activation" phenomenon is significant.

Each embodiment of the present specification is described in a progressive manner, each embodiment focuses on the difference from other embodiments, and reference may be made to each other for the same and similar parts between the embodiments.

Specific examples are used herein to explain the principles and implementation modes of the present disclosure. The foregoing description of the embodiments is merely intended to help understand the method of the present disclosure and its core ideas. Besides, various modifications may be made by those of ordinary skill in the art to specific implementation modes and the scope of application in accordance with the ideas of the present disclosure. In conclusion, the content of the present specification shall not be construed as limitations to the present disclosure.

What is claimed is:

1. An assistant system for solution-phase synthesis, comprising: a novel reactor, a mixing device, a temperature control device and a host computer; wherein
   the novel reactor is arranged on the mixing device, and the mixing device and the temperature control device are both electrically connected to the host computer; and
   the novel reactor comprises a bottle body, and the bottle body comprises a reaction inner container, a temperature circulating layer and a vacuum layer from inside to outside in sequence.

2. The assistant system for solution-phase synthesis according to claim 1, wherein the novel reactor further comprises: a bottle mouth, a sample injection port, an gas outlet, a sampling port, a circulating liquid outlet and a circulating liquid inlet, wherein
   a given angle is formed between the sample injection port and the bottle mouth; the gas outlet and the sample injection port are symmetrically arranged with respect to a center line of the bottle mouth; the sampling port is in communication with the reaction inner container; a bottom of the reaction inner container has an arc-shaped structure; and
   the circulating liquid outlet and the circulating liquid inlet are both in communication with the temperature circulating layer, and the circulating liquid outlet and the circulating liquid inlet are arranged diagonally.

3. The assistant system for solution-phase synthesis according to claim 2, wherein the temperature control device comprises a low-temperature circulator, wherein
   a liquid outlet of the low-temperature circulator is connected to the circulating liquid inlet through a pipe; and
   a liquid inlet of the low-temperature circulator is connected to the circulating liquid outlet through a pipe.

4. The assistant system for solution-phase synthesis according to claim 2, further comprising a light source device, wherein the light source device comprises an ultraviolet light source, and
   the ultraviolet light source is configured to illuminate the novel reactor.

5. The assistant system for solution-phase synthesis according to claim 4, wherein the ultraviolet light source is a light source of a mercury lamp of a type of CEL-M series.

6. The assistant system for solution-phase synthesis according to claim 2, wherein the given angle is 60°.

7. The assistant system for solution-phase synthesis according to claim 2, wherein a space included angle between a center line of the sampling port and a center line of the gas outlet is 60°.

8. The assistant system for solution-phase synthesis according to claim 2, wherein an upper cover is arranged on the bottle mouth, and the upper cover is a high-light-transmittance quartz plate.

9. The assistant system for solution-phase synthesis according to claim 1, wherein the mixing device comprises an automatic stirrer and a thermostat tray, wherein
   the automatic stirrer and the thermostat tray are both electrically connected to the host computer; the automatic stirrer is configured for stirring a mixed solution in the novel reactor in accordance with a stirring instruction from the host computer; the novel reactor is arranged on the automatic stirrer; and the thermostat tray is configured for keeping a temperature of the novel reactor constant.

* * * * *